Jan. 29, 1963   L. M. PUSTER   3,075,537
SAFETY CONTROL SYSTEM FOR A PRIME MOVER
Filed May 24, 1961   2 Sheets-Sheet 1

INVENTOR.
Louis M. Puster
BY
Mead, Browne, Schuyler & Beveridge.
ATTORNEYS 3,075,537
SAFETY CONTROL SYSTEM FOR A
PRIME MOVER
Louis M. Puster, Knoxville, Tenn., assignor to Robertshaw-Fulton Controls Company, Richmond, Va., a corporation of Delaware
Filed May 24, 1961, Ser. No. 112,388
9 Claims. (Cl. 137—16)

This invention relates to safety control systems for prime movers or similar equipment, and more particularly, to a pressure responsive or pneumatic system especially designed to prevent inadvertent restarting of the prime mover after an automatically induced safety shutdown. In certain of its more detailed aspects, the invention relates to a pressure pulse relay employed in a system of the foregoing type.

One example of a system to which the disclosed invention is especially adapted is the monitoring of prime movers or engines employed to drive pumps used in the interstate transmission of natural gas. Prime movers employed in systems of this type are designed to operate by using natural gas for fuel, and thus need be attended only periodically. Because of the combustible properties of natural gas, an electrically operated safety control system for prime movers of this type is undesirable because of the possibility of sparking. Thus, the advantages of employing an all-pneumatic or pressure responsive control system in such an environment are believed to be obvious.

The general requirements of such a system include the provision of various sensing devices to monitor selected operating conditions of the prime mover. Typical conditions which may be monitored are bearing temperatures (to detect incipient bearing failure), fuel supply pressure, engine vibration, etc. Upon the detection of an abnormal operating condition, the control system must function to discontinue operation of the prime mover. Once operation of the prime mover is shut down by operation of the system, the system must function in a manner such that correction of the abnormal condition is made before the prime mover is again placed in operation. Since certain of the usual monitored conditions, such as an increase in bearing temperature, return to the normal state when the prime mover is shut down, the system cannot rely fully upon the monitoring devices, but must, in addition, provide some positive lockout to prevent inadvertent starting of the prime mover after a failure occasioned shutdown.

Accordingly, it is an object of the present invention to provide a safety control system of the type referred to above operable entirely by fluid pressure.

It is another object of the invention to provide a pressure responsive safety control system of the type referred to above which will automatically monitor operation of a prime mover to discontinue operation of the prime mover on the detection of an incipient failure.

Another object of the invention is to provide a pneumatically actuated safety control system requiring a two-step manual actuation to restore the system to operation following a failure induced shutdown.

Still another object of the invention is to provide a pressure pulse relay for employment in a system of the type described above which is pressure actuated in a fashion such that the relay may transmit only a single pressure pulse.

In the achievement of the foregoing and other objects, a safety control system embodying the present invention includes a pressure responsive fuel control device which is connected to function as a shutoff valve in the fuel supply line to the prime mover to be monitored. The fuel control device, when charged to a selected pressure, opens the fuel line to maintain the prime mover in operation. Condition monitoring devices on the prime mover are connected to the fuel line control device in a fashion such that upon the detection of an incipient failure in the prime mover, pressure is released from the fuel control device to shut off the fuel supply to the prime mover. The control system includes a pressure source which, when connected to the fuel control device, supplies the pressure charge to the device to hold the fuel line control to its open position. The system is so designed that the control device, when charged, closes a pulse relay to block communication between the pressure source and the fuel control device, while maintaining the pressure charge in the fuel control device.

The pulse relay includes a poppet-type valve which is spring biased to an open position, and, when open, places the control device in communication with the pressure source. The seat of the poppet valve faces the pressure source and the valve is so constructed that once closed, the pressure applied to the valve by the pressure source holds the valve in its closed position. The valve is so designed, however, that it must be moved to its closed position by the application of a force other than that exerted on it by the pressure system. This force is supplied by an operating stem which abuts the head of the poppet valve. The operating stem is driven in movement by a diaphragm, the diaphragm in turn being responsive to the pressure applied to the fuel control device. Thus, when the control device is charged to the selected pressure, this pressure actuates the diaphragm to drive the operating stem to move the head of the poppet valve against its seat. Once the poppet valve head is seated, it is maintained in the seated position by the pressure applied to the head from the pressure source. To insure that a sufficient pressure differential is applied to the poppet valve head to hold it in its closed position, a restricted orifice vent is connected in the system between the poppet valve and the fuel control device. To prevent the vent from releasing the pressure charge from the control device, a one-way check valve is connected in the system between the vent and the fuel line control device. The one-way check valve is, of course, so oriented that pressure can be transmitted through it from the source to the control device.

Upon the detection of an incipient failure by any of the condition monitoring devices associated with the system, the pressure is released from the fuel line control device, thus closing the fuel supply line to stop the prime mover and also releasing the pressure against the diaphragm associated with the pulse relay. Upon the release of pressure in this manner, the operating stem moves out of engagement with the poppet valve head and returns to its original position. However, the poppet valve head is still maintained in its closed position by the pressure differential across the poppet valve applied to the valve by the pressure source. To restore the system to operation, a manual valve is connected in the system between the pressure source and pulse relay, and to reset the system, the manual valve is first moved to a position which vents the pressure above the poppet valve head to permit it to be restored to its open position by the spring. The manual valve must then be returned to its original position to again connect the pressure source to the pulse relay.

Other objects and features of the invention will become apparent by reference to the following specification and drawings.

In the drawings:
FIG. 1 is a side elevational view of a pressure pulse relay embodying the invention;
FIG. 2 is a cross sectional view of the pressure pulse relay taken on the line 2—2 of FIG. 1 showing the relay in its open or unactuated condition;

Figure 1:
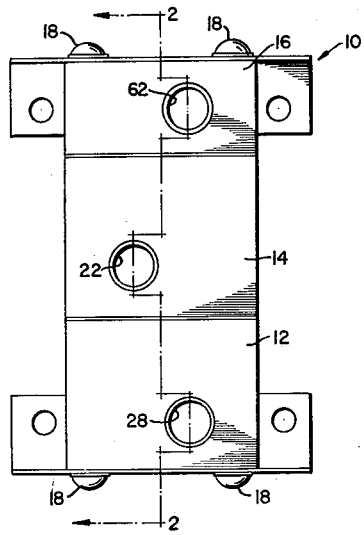

Details of a pulse relay valve designated generally 10 embodying the present invention are shown in FIGS. 1 through 4 of the drawings. Pulse relay 10 includes a housing which is formed by three metallic blocks 12, 14, and 16 which are fixedly secured to each other as by bolts 18. The facing surfaces of blocks 12 and 14 are recessed in a fashion such that when the blocks are assembled the recesses cooperatively define an inlet chamber 20 which communicates at its upper end with an inlet port 22 formed in central block 14. A passageway 24 is formed in lower block 12 and communicates at its upper end with inlet chamber 20. At its lower end, passageway 24 is in communication with an outlet chamber 26 which in turn communicates with an outlet port 28 formed in lower block 12.

Communication between inlet chamber 20 and passage 24 is controlled by a poppet type valve designated generally 30. Valve 30 includes an annular valve seat 32 which surrounds the upper end of passage 24. A valve head 34 is slidably guided for movement toward and away from valve seat 32 by a downwardly projecting stem 36 which is secured to head 34 and is slidably received in the upper end of passage 24. The sides of stem 36 are fluted as at 38 so that stem 36 does not block passage 24 against the passage of pressure fluid. A sealing ring 40 is mounted in the lower face of valve head 34 to form a seal between head 34 and seat 32 when head 34 is moved to the closed position as shown in FIGS. 3 and 4. Valve head 34 is normally biased to the open position shown in FIG. 2 by a compression spring 42 seated between the lower end of chamber 20 and a downwardly facing shoulder on valve head 34.

In normal operation of the valve, port 22 is connected to a source of fluid under pressure. The configuration of valve 30 is such that when the valve is in the open position shown in FIG. 2, the pressure applied at port 22 is substantially balanced across valve head 34 and spring 42 is operative to maintain the valve head in the open position. When valve head 34 is in the closed position shown in FIGS. 3 and 4, the pressure applied above the valve head is operable to maintain the valve head in the closed position.

Figure 2:
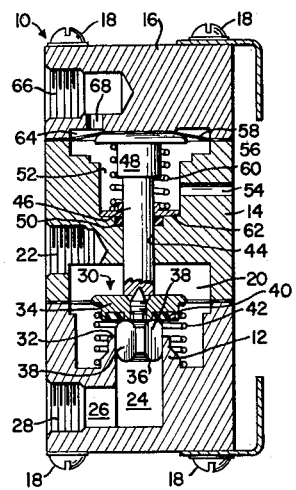
Figure 3:
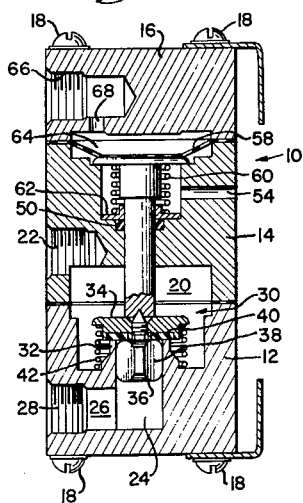
FIG. 3 is a cross sectional view similar to FIG. 2 showing the relay in one actuated position.
Figure 4:
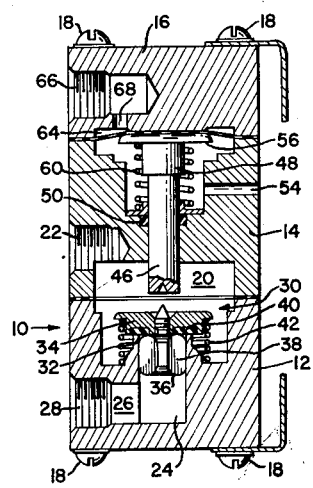
FIG. 4 is a cross sectional view similar to FIG. 2 showing the relay in another actuated condition.

It is thus necessary to apply some force other than that exerted by pressure applied at port 22 to shift valve head 34 from the open position of FIG. 2 to the closed position shown in FIGS. 3 and 4. Central block 14 is bored as at 44 to slidably receive the stem 46 of a valve operating member 48 which is operable to apply this force. An O-ring seal 50 is in sliding sealing engagement with stem 46 to prevent the leakage of pressure fluid along the walls of bore 44 from inlet chamber 20 into an upper cavity 52 formed in the upper portion of central block 14. Cavity 52 is vented by a venting bore 54.

The upper end of valve operating member 48 is formed with an enlarged diaphragm engaging shoe 56 which is biased into engagement with the lower surface of a diaphragm 58 by a compression spring 60 engaged between shoe 56 and a bushing 62 located at the lower end of cavity 52. In addition to providing a lower seat for spring 60, bushing 62 also acts to compress O-ring 50 to improve the seal.

Diaphragm 58 is engaged around its outer periphery between the facing surfaces of central block 14 and upper block 16, thus also serving as a gasket between the mating surfaces of the blocks. In the lower portion of upper block 16, a recess is formed to provide a control chamber 64 above diaphragm 58. Control chamber 64 communicates with a control port 66 in upper block 16 via passage 68.

Figure 5:
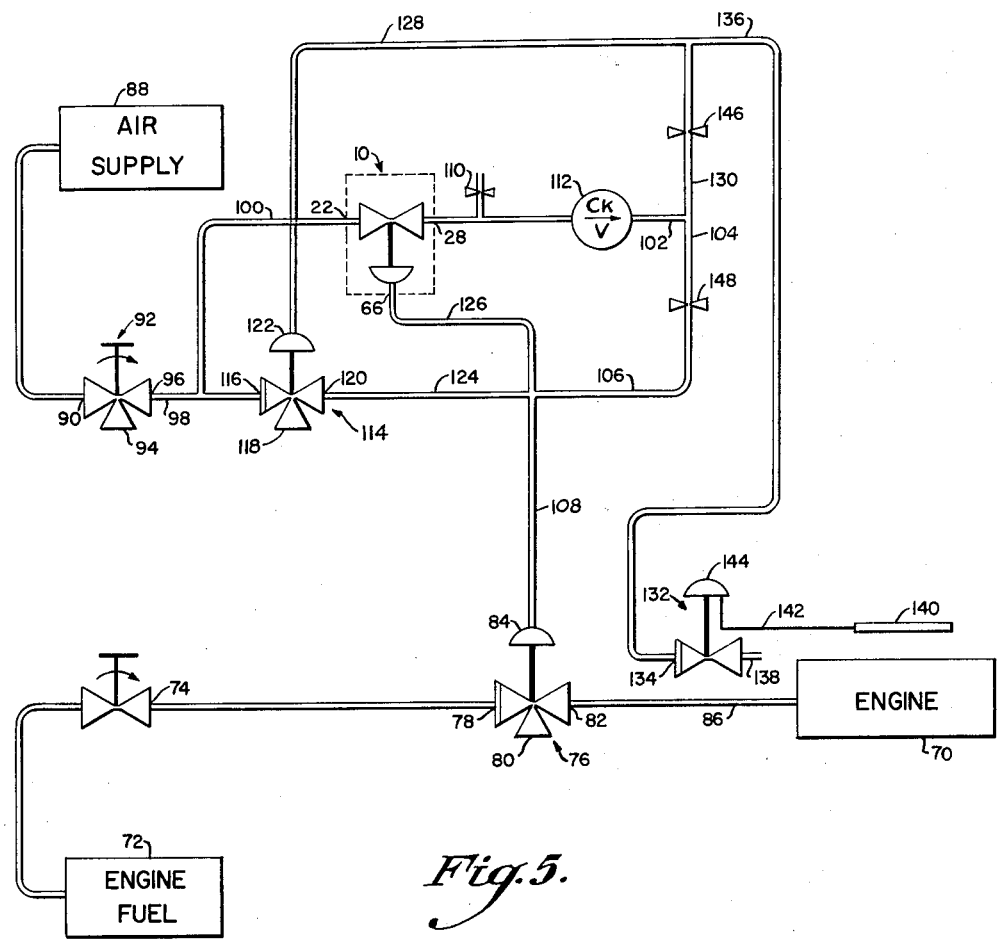
FIG. 5 is a schematic diagram of a safety control system embodying the invention.

Operation of pulse relay 10 may be best understood in terms of its operation in the safety control system diagrammatically shown in FIG. 5. The system shown in FIG. 5 is employed to control the operation of a prime mover such as an engine 70. Engine 70 is connected to a source of fuel 72 through a manually controlled valve 74 and a safety shutdown fuel control valve 76. The characteristics of engine 70 are such that the engine will operate whenever it is supplied with fuel—that is at any time when both valves 74 and 76 are open. Fuel control valve 76 may take the form of any of several commercially available diaphragm operated three-way valves having an inlet port 78, a venting port 80, and an outlet port 82. The internal connections of valve 76 are such that when no pressure is exerted upon its operating diaphragm 84, port 82 is connected to port 80, thereby venting the portion of the engine fuel supply line 86 connected between port 82 and engine 70. With the valve disposed to connect ports 80 and 82 to each other, port 78 is blocked. When diaphragm 84 is charged with pressure, the connections of the valve are shifted in a fashion such that ports 78 and 82 are connected to each other while venting port 80 is blocked.

To place engine 70 in operation, diaphragm 84 of valve 76 is charged with pressure supplied from a pressure source 88. The outlet of pressure source 88 is connected to a port 90 of a manually operated three-way valve 92. In addition to port 90, valve 92 is provided with a venting port 94 and a third port 96. Valve 92 may be manually moved to either of two positions. When the valve is in one position, port 90 is blocked while port 96 is connected to venting port 94. When valve 92 is manually shifted to its alternative position, ports 90 and 96 are connected to each other while venting port 94 is blocked.

Port 96 of valve 92 is connected via conduit 98 and conduit 100 to port 22 of pulse relay 10. Outlet port 28 of pulse relay 10 is connected via conduits 102, 104, 106 and 108 to diaphragm 84 of engine fuel control valve 76. For purposes to be explained in greater detail below, a restricted orifice vent 110 is connected in conduit 102 between outlet port 28 of pulse relay 10 and a one-way check valve 112. One-way check valve 112 is oriented so that vent 110 is ineffective to bleed pressure from conduit 104.

A second diaphragm operated three-way valve 114 is employed in the system and includes a first port 116 connected via conduit 98 to port 96 of manually actuated three-way valve 92. Valve 114 also includes a venting port 118, a third port 120 and a diaphragm chamber 122. Port 120 of valve 114 is connected via conduit 124 to the junction of conduits 106 and 108, this junction also being connected via conduit 126 to control port 66 of pulse relay 10. Diaphragm chamber 122 of valve 114 is connected to the junction of conduits 102 and 104 via conduit 128 and conduit 130. The internal connections of valve 114 are the same as valve 76. When no pressure is supplied to diaphragm 122 of valve 114, port 116 is blocked while port 120 is connected to vent port 118. When diaphragm chamber 122 is charged with pressure, port 116 is connected to port 120 while vent port 118 is blocked.

In addition to the foregoing structure, the system of FIG. 5 includes a safety dump valve 132 having a first port 134 connected via conduit 136 to the junction of conduits 128 and 130. Valve 132 is also provided with a vented port 138 and communication between ports 134 and 138 is controlled by a condition monitoring system which may include a condition responsive bulb 140 which communicates via conduit 142 with a diaphragm chamber or bellows 144 of valve 132. Elements 140, 142, and 144 may take the form of a conventional temperature responsive bulb assembly in which bulb 140 might be employed to sense bearing temperature on engine 70. Upon an increase in temperature of the monitored engine bearing, the increased temperature would cause temperature responsive fluid contained in bulb 140, conduit 142 and bellows 144 to expand and expansion of bellows 144 would then be employed to shift valve 132 from a normal position in which port 134 is blocked to a venting position in which communication is established between ports 134 and 138 to vent conduit 136. The monitoring of bearing temperature in the foregoing manner is but one of many operating conditions of engine 70 which might be monitored. Additional condition responsive monitoring devices may be added and connected into the safety control system in a fashion such that conduit 128 is vented upon the occurrence or sensing of an abnormal monitored condition.

In addition to the elements described above, conduits 130 and 104 may be provided with restricting orifices such as 146 and 148, respectively, to control the rate of flow of fluid through the respective conduits.

Operation of the system is as follows. Manual fuel control valve 74 is manually actuated to its open position. Opening of valve 74 does not, at this time, supply fuel to engine 70 since the diaphragm actuated fuel control valve 76 is not pressurized and hence port 78 of valve 76 is blocked. With fuel valve 74 in its open position, manually operated valve 92 is moved to the position where port 90 is connected to port 96 and venting port 94 is blocked. With the manual valve 92 in this position, inlet port 22 of pulse relay 10 is in communication with the pressure source 88 via conduits 98 and 100. Port 116 of valve 114 is blocked at this time since its operating diaphragm 122 is not yet pressurized.

Referring now to FIGS. 2 through 4, pulse relay 10 is, at this moment, in the position shown in FIG. 2 with poppet valve 30 open and valve operating member 48 in its upper position, to which it is biased by spring 60. Valve head 34 of poppet valve 30 is likewise biased by its spring 42 to the position of FIG. 2. Further upward movement of valve head 34 is prevented by the engagement between head 34 and the lower end of stem 46. With pulse relay 10 in the FIG. 2 position, pressure fluid from source 88 flows inwardly through inlet port 22 into chamber 20 past the open valve head 34 of poppet valve 30 and through passage 24, chamber 26, to outlet port 28. Returning now to FIG. 5, from outlet port 28, fluid under pressure passes through one-way check valve 112 and into conduits 130 and 104. Pressure fluid flowing into conduit 104 passes through conduit 106 and thence into conduits 108, 124, and 126. Since the diaphragm 122 of valve 114 is not pressurized as yet, port 120 is connected to venting port 118 of valve 114 and hence pressure cannot build up in either of conduits 108 or 126 to a degree sufficient to charge diaphragm 84 of fuel control device 76 nor can pressure in conduit 126 connected to port 66 of pulse relay 10 build up to a pressure sufficient to actuate diaphragm 58 of the pulse relay.

Pressure supplied to conduit 130, however, passes into conduits 128 and 136. Assuming that control bulb 140 as described above is employed to monitor bearing temperature, the bearing will be cool and hence valve 132 will be closed and port 134 will be blocked. Pressure can thus build up in conduit 128 to a degree sufficient to shift diaphragm 122 of valve 114, thereby shifting the internal connections of valve 114 to block vent port 118 and simultaneously connected port 116 to port 120. This permits pressure in conduits 108 and 126 to build up to a degree to operatively charge diaphragm 84 of fuel control valve 76 to shift the internal connections of the fuel control valve to place ports 78 and 82 in communication with each other and to block venting port 80, thereby permitting fuel to be supplied to engine 70 to place the engine in operation.

Returning now to FIGS. 2 through 4, inclusive, the pressure in conduits 108 and 126 is equalized by virtue of the direct connection of the conduits to each other. Thus, when diaphragm 84 is operatively charged with pressure, a similar pressure exists in conduit 126 and is applied to diaphragm 58 of pulse relay 10 through port 66, passage 68 and thus into chamber 64. Spring 60, which normally maintains diaphragm 58 in the FIG. 2 position, has a characteristic such that when the diaphragm 84 of fuel control valve 76 is charged to an operative pressure, the operative pressure is sufficient to drive diaphragm 58 downwardly from the FIG. 2 position to that shown in FIG. 3.

As valve operating stem 48 moves downwardly from the FIG. 2 position to that of FIG. 3, the lower end of valve stem 46 pushes valve head 34 downwardly from the open position of FIG. 2 to the closed position of FIG. 3. Once valve head 34 is seated as in FIG. 3, the the pressure differential between the upper and lower sides of the valve head as viewed in FIG. 3, is sufficient to maintain valve head 34 in the FIG. 3 position against the action of spring 42. This pressure differential is further increased, upon the closing of valve 30, by the action of restricted orifice vent 110 which further reduces the pressure in passageway 24, outlet chamber 26, and that portion of conduit 102 between port 28 and one-way check valve 112. One-way check valve 112 acts, at this time, to prevent leakage of pressure from lines 104 and 130. Vent 110 is restricted to a degree such that it has little effect upon the pressure in conduit 102 when valve 30 is open.

With the system conditioned as above, the system is in its normal operating condition, and will stay in this condition as long as condition monitoring devices such as control bulb 140 and valve 132 indicate proper operation of engine 70. Assuming that bulb 140 is employed to monitor the temperature of a bearing of engine 70 and that the bearing begins to heat up, the bearing temperature as sensed by bulb 140 begins to rise. As the temperature rises, the fluid contained in bulb 140, conduit 142 and bellows 144 expands in direct proportion to the temperature increase. Should the temperature increase beyond the upper end of a selected bearing temperature operating range, bellows 144 shifts valve 132 to a position such that port 134 is connected to venting port 138.

The foregoing action vents conduit 136 and, since conduit 136 is directly connected to conduit 128, conduit 128 is vented to release the pressure applied to diaphragm 122 of valve 114. When diaphragm 122 of valve 114 is vented, valve 114 returns to its original position in which port 116 is blocked and port 120 is connected to venting port 118. With the foregoing connections established within valve 114, conduit 124, and hence conduits 108 and 126, are vented through port 118, thus releasing the pressure charge from diaphragm 84 of fuel control valve 76. When the pressure charge is released from diaphragm 84, valve 76, like valve 114, returns to its original position in which port 78 is blocked to prevent further flow of fuel to engine 70 and fuel in that line 86 of engine 70 is vented by virtue of the connection of port 82 of valve 76 to venting port 80.

The venting of conduit 124 likewise vents conduit 126, thereby releasing pressure from control chamber 64 of pulse relay 10. Release of pressure from chamber 64 permits spring 60 to return valve operating member 48 and diaphragm 58 to their original positions. This condition is illustrated in FIG. 4. Although the lower end of valve stem 46 is lifted out of engagement with valve head 34, valve head 34 remains in its closed position, as shown in FIG. 4, since the pressure applied by pressure source 88 to port 22 and inlet chamber 20 greatly exceeds that pressure acting on valve head 34 from passageway 24. Since presumably the system has been in operation for a reasonable period of time, the pressure in passage 24 at the time of failure is, in all probability, substantially equal to atmospheric pressure since passage 24 has been in communication with atmosphere through vent 110 during the entire time period that engine 70 has been in normal operation.

Thus, the pressure of pressure source 88 is applied to poppet valve 30 to maintain valve 30 closed, once it has been closed, independently of valve operating member 48. In order to reset the system, it is necessary to release the pressure from chamber 20 so that spring 42 can return valve head 34 to the FIG. 2 position. This can be accomplished only by manually actuating valve 92 to block port 90, thereby isolating pressure source 88 from the system, and simultaneously connecting port 96 to vent port 94 to vent conduits 98 and 100, thereby placing inlet chamber 20 in communication with atmosphere.

While an exemplary embodiment of the invention has been disclosed, it will be apparent to those skilled in the art that the disclosed embodiment may be modified. Therefore, the foregoing description is to be considered exemplary rather than limiting, and the true scope of the invention is that defined in the following claims.

I claim:

1. For use in combination with a pressure source and a control device adapted to be charged with pressure by said source; pulse relay means for transmitting a single pressure pulse from said source to said device to charge said device to a predetermined pressure, said relay means comprising a valve housing having an inlet chamber, an outlet chamber and a passageway extending from said inlet chamber to said outlet chamber, means for connecting said inlet chamber to said pressure source, normally open poppet valve means in said inlet chamber movable to a closed position overlying the inlet chamber end of said passageway to block communication between said inlet chamber and said outlet chamber, means for connecting said outlet chamber to said control device to place said device in communication with said pressure source when said valve means is in its normally open condition, means operable in response to the charging of said device by said pressure source to said predetermined pressure for moving said valve means to its closed position, and means operable when said valve means is in said closed position for reducing the pressure in said passageway below the pressure applied to said inlet chamber by said pressure source whereby said valve means is maintained in said closed position.

2. For use in combination with a pressure source and a control device adapted to be charged with pressure by said source; pulse relay means for transmitting a single pressure pulse from said source to said device to charge said device to a predetermined pressure, said relay means comprising a valve housing having an inlet chamber, an outlet chamber, and a passageway extending from said inlet chamber to said outlet chamber, means at the inlet chamber end of said passageway defining a valve seat facing into said inlet chamber, a valve head mounted in said inlet chamber for movement between an open position wherein said valve head is spaced from said valve seat to place said inlet chamber in communication with said outlet chamber and a closed position wherein said valve head is seated upon said seat to block communication between said inlet chamber and said outlet chamber, means normally biasing said valve head to said open position, means for connecting said outlet chamber to said control device to place said device in communication with said pressure source when said valve head is in said open position, means operable in response to the charging of said device by said pressure source to said predetermined pressure for moving said valve head to its closed position, and means operable when said valve means is in said closed position for reducing the pressure in said passageway below the pressure applied to said inlet chamber by said pressure source whereby said valve head is maintained in said closed position by the pressure differential between said inlet chamber and said passageway.

3. For use in combination with a pressure source and a control device adapted to be charged with pressure by said source; pulse relay means for transmitting a single pressure pulse from said source to said device to charge said device to a predetermined pressure, said relay means comprising a valve housing having an inlet chamber, an outlet chamber, and a passageway extending from said inlet chamber to said outlet chamber, normally open poppet valve means in said inlet chamber movable to a closed position overlying the inlet chamber end of said passageway to block communication between said inlet chamber and said outlet chamber, means for connecting said outlet chamber to said control device to place said device in communication with said pressure source when said valve means is in its normally open position, a valve operating member mounted within said housing for movement between a rest position wherein said member is spaced from said valve means and an actuated position in engagement with said valve means, said valve operating member being operable upon movement from said rest position to said actuated position to drive said valve means from its normally open position to said closed position, means normally maintaining said valve operating member in said rest position, means operable in response to the charging of said control device by said pressure source to said predetermined pressure for moving said valve operating member from said rest position to said actuated position, and means operable when said valve means is in said closed position for establishing a pressure differential across said valve means to maintain said valve means in said closed position independently of said valve operating member.

4. Apparatus as defined in claim 3 wherein said valve means comprises means at the inlet chamber end of said passageway defining a valve seat facing into said inlet chamber, a valve head mounted in said inlet chamber for movement into and out of engagement with said valve seat, and means biasing said valve head away from said valve seat.

5. Apparatus as defined in claim 3 wherein said means operable when said valve means is in said closed position for reducing the pressure in said passageway comprises a restricted orifice vent in communication with the outlet chamber end of said passageway.

6. Apparatus as defined in claim 5 further comprising a one-way check valve located in said means for connecting said outlet chamber to said control device at a location between said restricted orifice and said control device, said one-way check valve being oriented to permit fluid flow only toward said control device.

7. A safety control system for a prime mover or the like comprising a pressure responsive control means operable when charged to a selected pressure to maintain said prime mover in operation and operable upon the release of pressure to discontinue operation of said prime mover, a pressure source for charging said control means to a selected pressure, conduit means connecting said pressure source to said control means, valve means in said conduit means normally biased to an open position to place said pressure source in communication with said control means, said valve means being operable upon movement to a closed position wherein said valve means is maintained by the pressure exerted thereon by said pressure source to block communication between said pressure source and said control means, means responsive to the pressure in said control means for moving said valve means to said closed position when the pressure in said control means reaches said selected pressure, and means responsive to a selected abnormal variation of a monitored operating condition of said prime mover for releasing the pressure charge from said control means.

8. A safety control system as defined in claim 7 further comprising a two-position valve connected in said conduit means between said pressure source and said valve means, said two-position valve being operable in one position to connect said pressure source to said valve means, and being operable in its other position to disconnect said pressure source from said valve means and simultaneously release pressure from said valve means.

9. A safety control system for a prime mover or the like comprising a pressure responsive control means operable when charged with pressure to maintain said prime mover in operation and operable upon the release of pressure to discontinue operation of said prime mover, a pressure source for charging said control means to a selected pressure, conduit means connecting said pressure source to said control means, valve means in said conduit means normally biased to an open position to place said source in communication with said control means, said valve means being operable upon movement to a closed position wherein said valve means is maintained by the pressure exerted thereon by said source to block communication between said pressure source and said control means, a one-way check valve in said conduit means between said valve means and said control means, restricted venting means in said conduit means for bleeding pressure from that portion of said conduit means between said valve means and said one-way check valve, said check valve being oriented to prevent the bleeding of pressure from said control means by said venting means, means responsive to the pressure in said control means for moving said valve means to said closed position when the pressure in said control means reaches said selected pressure, and means responsive to a selected abnormal variation of a monitored operating condition of said prime mover for releasing the pressure charge from said control means.

References Cited in the file of this patent

UNITED STATES PATENTS

| | | |
|---|---|---|
| 1,600,322 | Davis | Sept. 21, 1926 |
| 2,714,290 | Rachuig | Aug. 2, 1955 |
| 2,714,883 | Metzger | Aug. 9, 1955 |